United States Patent [19]
Ferrero

[11] Patent Number: 5,653,465
[45] Date of Patent: Aug. 5, 1997

[54] SEATS FOR VEHICLES, FOR EXAMPLE, SPORTS VEHICLES SUCH AS GO-KARTS AND THE LIKE

[75] Inventor: Pietro Ferrero, Rhode St. Genèse, Belgium

[73] Assignee: Ferrero, S.p.A., Alba, Italy

[21] Appl. No.: 528,406

[22] Filed: Sep. 14, 1995

[30] Foreign Application Priority Data

Sep. 16, 1994 [IT] Italy ................. TO94A0724

[51] Int. Cl.⁶ ............................................. B60R 21/04
[52] U.S. Cl. ............... 280/753; 280/730.1; 244/122 AG; 297/464
[58] Field of Search ................. 280/753, 730.1, 280/751, 730.2; 244/122 R, 122 A, 122 AG; 297/464, DIG. 8

[56] References Cited

U.S. PATENT DOCUMENTS

| | | | |
|---|---|---|---|
| 4,359,200 | 11/1982 | Brevard et al. | 280/730.2 |
| 4,553,783 | 11/1985 | Lagana | 296/31 P |
| 4,817,985 | 4/1989 | Enokimoto et al. | 280/690 |
| 4,946,191 | 8/1990 | Putsch | 280/730.2 |
| 5,039,162 | 8/1991 | Yoshida | 297/DIG. 8 X |
| 5,301,903 | 4/1994 | Aronne | 244/122 AG |
| 5,348,342 | 9/1994 | Haland et al. | 280/730.2 |
| 5,464,246 | 11/1995 | Castro et al. | 280/730.2 |
| 5,499,840 | 3/1996 | Nakano | 280/730.1 |

FOREIGN PATENT DOCUMENTS

| | | |
|---|---|---|
| 0618128 | 2/1994 | European Pat. Off. . |
| 2661646 | 11/1991 | France . |
| 2670739 | 6/1992 | France . |
| 0314645 | 12/1989 | Japan ................. 280/730.1 |
| 1405333 | 9/1975 | United Kingdom . |
| 2030527 | 4/1980 | United Kingdom . |
| 2054477 | 2/1981 | United Kingdom . |
| 9405189 | 3/1994 | WIPO . |

*Primary Examiner*—Christopher P. Ellis
*Attorney, Agent, or Firm*—Rothwell, Figg, Ernst & Kurz

[57] ABSTRACT

A seat has a shell structure (2) which is rigid, as a whole. On a side of the shell structure which is intended to receive the driver's body, there are one or more inflatable cushions (4a, 5a). With the present invention, the possibility of varying the inflation pressure of the cushions (4a, 5a selectively during movement of the vehicle is also envisioned.

31 Claims, 1 Drawing Sheet

SEATS FOR VEHICLES, FOR EXAMPLE, SPORTS VEHICLES SUCH AS GO-KARTS AND THE LIKE

BACKGROUND OF THE INVENTION

1. Field of the Invention

The present invention relates to seats for vehicles having a receiving structure which can receive at least part of a user's body.

The invention has been developed with particular concern for its possible application to sports vehicles, such as go-karts and the like.

2. Description of the Background Arts

In this field of application (to which explicit reference will be made below in the present description although this should not be interpreted as limiting the scope of the invention in any sense), there has always been a tendency to use simple bodies and shells of rigid material for the seats. This has been as much for practical reasons (to minimise weight) as for the desire to make the vehicle simple and spartan in view of its function as a competitive vehicle.

With the continuous improvements in the performance of such vehicles there is, however, a corresponding increase in the forces experienced by the driver's body as a result of accelerations, with the consequential possibility that the performance may be limited.

In the context described above, the use of solutions which are already known in the field of conventional motor-vehicle seats (for example: quantities of padding of various types, associated spring elements, etc.) does not provide an answer to the problems stated above. Usually these conventional solutions require the adoption of more or less fixed structures which are just as difficult to adapt to the different anthropometric characteristics and/or habits of the individual sportsman as to the different conditions of movement.

SUMMARY OF THE INVENTION

The object of the present invention is to provide a solution to the requirements indicated above while overcoming the limitations intrinsic in prior art solutions.

According to the present invention, this object is achieved by means of a seat having characteristics as in the claims which follow.

BRIEF DESCRIPTION OF THE DRAWINGS

The invention will now be described, purely by way of non-limitative examples, with reference to the appended drawings, in which.

DETAILED DESCRIPTION OF THE PREFERRED EMBODIMENTS

Figure 1:
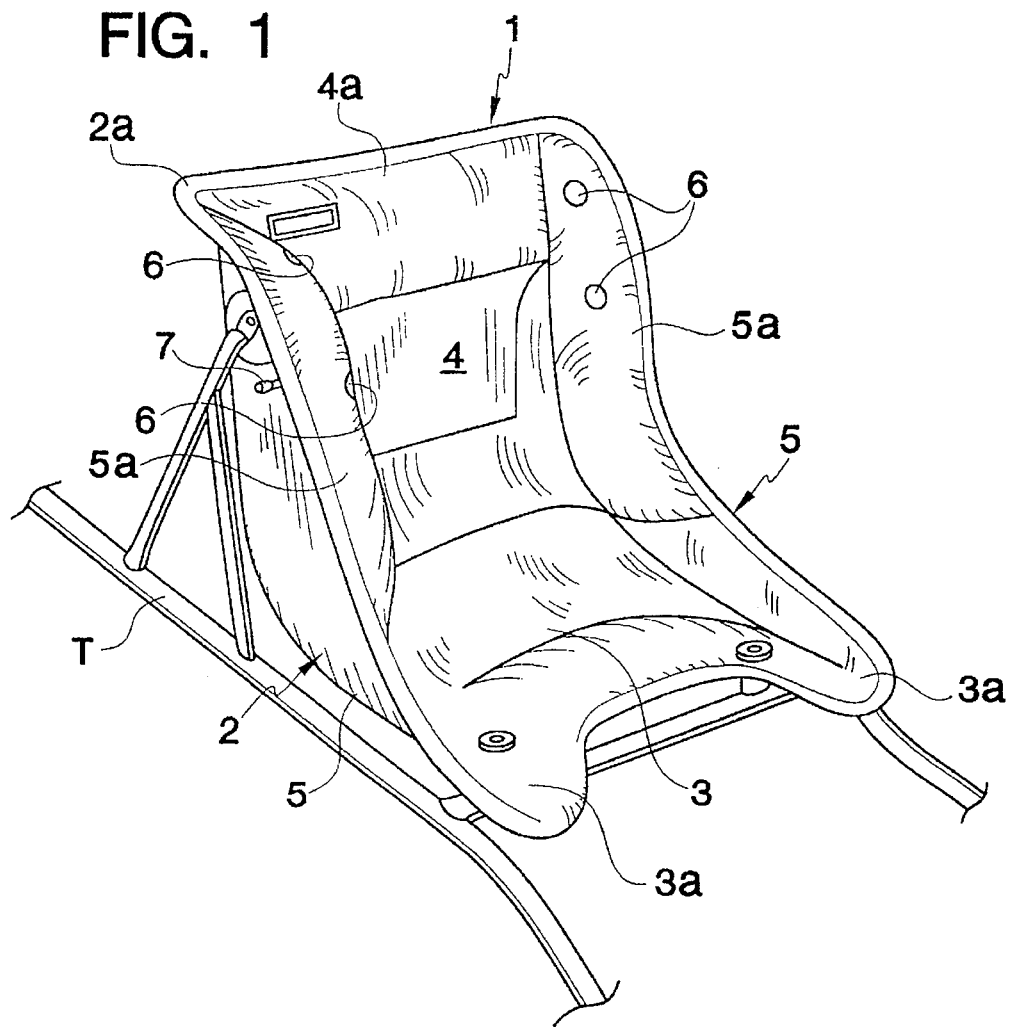
FIG. 1 is a general perspective view of a seat according to the invention.

In the drawings, a vehicle seat is generally indicated as 1.

The specific embodiment shown is concerned with a seat for a motorised sports vehicle such as a go-kart; however, other fields of application can be envisioned.

In accordance with a known solution, the seat 1 comprises a shell 2 of a material such as a light metal or, more preferably, a structural synthetic material such as a glass fiber reinforced resin, plastics a material, etc., defining a shell-shaped structure which, as a whole, is rigid and can be fixed (according to well known criteria) to the vehicle body. As shown schematically in FIG. 1, the body can be in the form of several tubes which make up the frame of a go-kart (not illustrated in its entirety). The definition of the structure of the shell 2 as being "as a whole" rigid is intended to indicate that this structure may possibly include more or less flexible parts. What matters, however, is that this structure is rigid overall so that its concave side, which faces upwardly in use, can receive at least part (typically most of the trunk and proximal portions of the lower limbs) of the body of a passenger (such as, for example, the driver of a go-kart).

The shell 2 is shaped so that the seat 1 has a seat proper 3, a backrest 4 and two sides 5 shaped so as to give the seat 3 and the backrest 4 a generally channel shape so as, effectively, to contain the driver's body laterally. The shell 2 thus defines overall, a shell shape with a concave inner surface which can receive at least part of the user's body.

In a preferred solution (also known per se), the seat also has two front appendages 3a which project forwardly so as to provide good support for the popliteal region the driver's legs.

The solution of covering at least the inner surface of the shell 2 intended to receive the driver with a covering of a material such as "alcantara" is already known. This is as much for aesthetic reasons as for providing a certain degree of friction with the driver's body so as to prevent him from slipping on the seat, particularly due to accelerative forces which arise during movement of the vehicle.

A salient characteristic of the solution of the invention is the provision of at least one selectively inflatable cushion element in the region of the seat intended to be between the shell 2 and the driver's body (that is, on the inner surface of the shell 2), the cushion being inflatable by a fluid, preferably a gas.

In the currently preferred embodiment, three cushion elements of this type are provided. More precisely, two cushions 5a are located one against the upper part of each of the sides 5 (thus on the sides of the backrest 4) and a third cushion 4a extends horizontally along the upper part of the backrest 4.

Preferably, the cushions 4a, 5a (constituted for example by inflatable pads made of a material such as that used for the inner tubes of tires) are interposed between the shell 2 and the cover 2a. With this arrangement, one or more holes 6 can be present in those parts of the cover itself which cover the cushions. The purpose of the holes 6 is to allow air to pass through the cover 2a, avoiding the formation of "free" air cushions, that is, different from the cushions 4a, 5a, between the cover 2a and the shell 2.

The purpose of the cushions 4a, 5a is to form padding between the generally rigid structure of the seat 1 (i.e., the shell 2) and the driver's body. These cushions have both the function typical of padding (absorbing forces which can arise during movement) and that of holding the driver's body more precisely and effectively in the seat 1.

In the simplest embodiment, that to which FIG. 1 refers, the cushions 4a, 5a are constituted simply by pneumatic pockets, each of which may be inflated selectively, for example with the aid of a pump, through a respective valve 7 (only one of the valves is visible in FIG. 1), such as a valve commonly used for the inflation of pneumatic tires.

Each cushion may in turn be constituted by a single air chamber (inflation chamber) with a respective inflation valve or by a plurality of air chambers, preferably independent from each other and each having a respective inflation valve. The provision of several independent air chambers has the advantage of enabling each air chamber to be inflated differently according to its spatial location in the seat (and thus according to its position relative to the driver's body) so as to achieve a specific volume and/or a specific inflation pressure, and hence a specific rigidity, according to the requirements in use.

The solution of the invention thus starts from a generally standard seat structure 1 (shell 2 and cushions 4a, 5a) and—through selective inflation of the cushion—becomes a seat which, on its inner surface intended to receive the driver, has its conformation and characteristics of rigidity adapted, even locally (particularly when each cushion is constituted by several air chambers), to the specific anthropometric characteristics and/or tastes of the individual occupant.

The inflation of each cushion to a greater or lesser extent (i.e., to a greater or lesser pressure) also enables the seat 1 to be adapted to different requirements of use, for example to accord with differing track characteristics, to provide a choice, for example, between a generally softer, less restraining seat (cushions inflated to a "low" pressure) and a harder seat which clamps the driver's body more firmly (cushions inflated to a "higher" pressure).

The solution illustrated in FIG. 1 may be defined as static in the sense that—in general—it provides for the inflation of each cushion 4a, 5a to a desired pressure (for example with a pump) before the seat is used.

Figure 2:
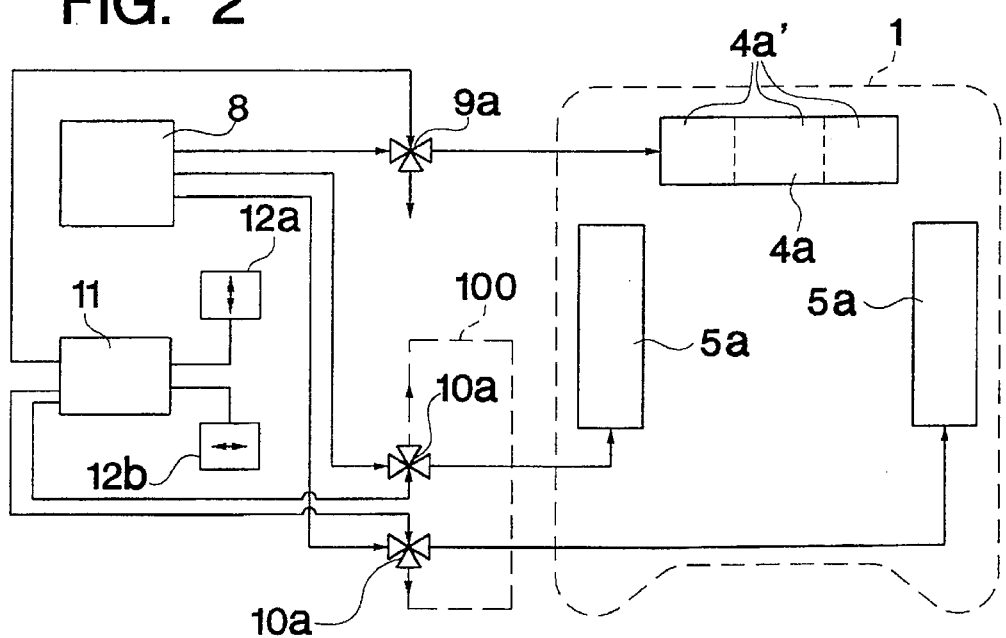
FIG. 2 shows a system for the automatic control of the characteristics of a seat according to the invention with reference to a currently preferred embodiment.

The schematic drawing of FIG. 2 shows, in one possible variant, how the invention also lends itself to being embodied in a dynamic configuration in which the degree of inflation (pressure) of each cushion 4a, 5a may be varied selectively, even during driving, and thus even when the seat 1 is occupied by the driver, for example during a sports competition.

The embodiment of FIG. 2 provides for the cushions 4a, a to be connected to a source 8 of pressurised fluid (typically pneumatic, although pressurised liquids may be used in certain cases—at least for some cushions or portions thereof) with the interposition of respective valves (solenoid valves) 9a, 10a (there are two of the latter since two cushions 5a are provided, one for each side 5 of the seat) controlled by a single processing or control unit 11.

FIG. 2 refers, for simplicity, to a solution in which each cushion 4a, 5a is individual in the sense that it comprises a single air chamber. It goes without saying that, if one or more of these cushions includes several air chambers, (such as 4a' shown with broken lines in FIG. 2) the solution of the invention may involve the provision of a corresponding number of solenoid valves.

In general the cushions 4a, 5a are initially to a reference pressure and then, during travel, by operation of the solenoid valves 9a, 10a the inflation pressure may be varied at will, both to increase it (by opening the solenoid valves 9a, 10a to positions in which the respective cushions are put in communication with the pressure source 8) and to reduce it (the valves 9a, 10a being switched to the positions in which the respective cushions are put in communication with a vent line to the exterior).

For this purpose, the solenoid valves 9a, 10a are typically valves which each have three connectors or ways: to the pressure source 8, to the respective cushion and to a vent outlet typically to the atmosphere.

All of this allows the selection of three operative positions, that is to say:

a closed (position with all three ways closed), the inflation pressure of the cushion being kept constant, a connection position with the pressure source 8 connected to the respective cushion 4a, 5a so as to increase the pressure to which the cushion is inflated, and a vent position with the pressure in the cushion vented to the exterior with a consequent reduction in the inflation pressure.

Although the following may be more complicated from an operational point of view, it is possible to provide for the pressurised fluid resulting from the venting of one cushion not to be simply discharged to the exterior. It is in fact possible to connect the various solenoid valves together, at least temporarily, (connections indicated schematically in broken outline by the reference 100 in FIG. 2) so that the pressure vented from one cushion is used at least partly to increase the pressure in another cushion. This is the case, for example, in solutions which provide for the control of the unit 11 by accelerometric signals (as best seen below), with the consequent possibility that the excess pressure resulting from the reduction in the inflation pressure of the cushion 5a on one side of the seat is used to increase the inflation pressure of the cushion 5a on the opposite side.

With regard to the pressure source 8, it is possible to use various solutions, particularly when one is dealing with a pneumatic source.

For example, the source 8 may simply be a cylinder. This solution has been shown to be advantageous particularly in those cases in which weight and bulk are determining factors.

Alternatively, the source 8 may be constituted by, or at least include, a compressor, preferably with an associated pressure accumulator. This solution, at least in some applications, may be exacting in terms of weight and, in particular, in that it will drain a degree of power from the propulsion unit of the vehicle. The solution of the invention, however, lends itself to the use of a compressor which can be activated, for example, only during the deceleration of the vehicle. In this case, as well as not draining useful power from the propulsion unit, the compressor can cooperate with the vehicle's braking system in effecting the deceleration.

With regard to the control unit 11 which governs the activation of the solenoid valves 9a, 10a (and hence controls selectively the inflation pressure of the cushions 4a, 5a), this may be an electronic control unit (of a type known per se) which can be controlled by the driver (for example by push-buttons on or adjacent the steering wheel).

In the currently preferred embodiment, the unit 11 is arranged to operate automatically in dependance on signals from two accelerometric sensors 12a, 12b mounted on the vehicle and in general sensitive to:

accelerations forward and rearward of the vehicle (sensor 12a); and accelerations transverse to the vehicle (sensor 12b).

These types of sensors include known accelerometric sensors, known particularly from the aeronautical field in which they are currently known as G-meters.

More particularly, the unit 11 may be programmed so that during a strong forward/rearward acceleration of the vehicle (for example as a result of a sharp acceleration such as that which occurs during the starting phase of a competition or during a resumption of driving), the signal produced by the sensor 12a (through) the unit 11 and the valve 9a) causes an increase in the inflation pressure of the cushion 4a which is at the top of the backrest 4. Thus, it is possible to avoid the driver's back being squashed against the shell of the seat 2 since the cushion 4a is interposed like elastic padding between the shell 2, itself, and the driver's back. Once the strong acceleration has ceased, the inflation pressure of the cushion 4a may be returned to a normal reference value (selected by the driver) so as to achieve the appropriate padding for normal driving conditions.

The same solution is adopted for the side cushions 5a. When the vehicle is moving in a straight line, these are kept at a uniform pressure (the cushions possibly being at different pressures if so desired by the driver) and the pressures are then increased selectively when the vehicle changes direction and the driver's body is thrust sideways—by centrifugal force—towards one side 5 of the seat 1. The sensor 12b detects the strength and direction of the centrifugal acceleration and acts through the solenoid valves 10a to increase the inflation pressure of the cushion which is compressed at that moment between the driver's body and the side 5 towards which the driver's body is thrust. More particularly, in the case of a zig-zag path, the inflation pressures of the cushions 5a on the two sides are modified alternately, with the possibility of using at least some of the excess pressure discharged from one cushion to increase the pressure in the cushion on the opposite side (line 100 in FIG. 2).

Naturally, with the principles of the invention remaining the same, the constructional details and forms of the embodiments may be varied widely with respect to that described and illustrated without thereby departing from the scope of the present invention.

I claim:

1. A vehicle seat, comprising:
   a receiving structure having a surface which can receive at least part of a user's body,
   at least one selectively inflatable cushion interposed between the receiving structure and the user's body in use; and
   automatic control means for dynamically increasing and decreasing the degree of inflation of said at least one cushion during driving based on motion of the vehicle.

2. A seat according to claim 1, wherein the receiving structure includes two opposite sides (5) and said at least one inflatable cushion includes an inflatable cushion (5a) provided against each of the sides (5).

3. A seat according to claim 1, wherein the receiving structure includes a backrest (4) with a respective upper end and said at least one cushion includes an inflatable cushion (4a) provided at the upper end.

4. A seat according to claim 1, wherein at least one of said at least one cushion (4a, 5a) comprises a single inflatable chamber.

5. A seat according to claim 1, wherein at least one of said at least one cushion (4a, 5a) comprises a plurality of inflatable chambers.

6. A seat according to claim 1, wherein said automatic control means has associated means (7) for controlling the supply of at least one inflating fluid.

7. A seat according to claim 6, wherein said at least one inflating fluid includes a gas.

8. A seat according to claim 1, wherein the receiving structure has an associated covering layer (2a) and the at least one cushion (4a, 5a) is interposed between the receiving structure (2) and the covering layer (2a), even when said at least one cushion is fully inflated.

9. A seat according to claim 8, wherein the covering layer (2a) has apertures (6) in correspondence with the at least one cushion (4a, 5a).

10. A seat according to claim 1, wherein said automatic control means has a pressurised-fluid source (8) for the inflation of the at least one cushion (4a, 5a).

11. A seat according to claim 10, wherein the pressurised-fluid source (8) includes a cylinder.

12. A seat according to claim 10, wherein the pressurised-fluid source (8) includes a compressor.

13. A seat according to claim 12, wherein the compressor is driven by the propulsion unit of the vehicle and is activated selectively during deceleration of the vehicle itself.

14. A seat according to claim 10, wherein said automatic control means includes valve means interposed between the at least one cushion (4a, 5a) and the pressurised-fluid source (8).

15. A seat according to claim 14, wherein said automatic control means includes control means (11) for switching the valve means (9a, 10a) selectively between:
   a closed position,
   a first open position in which the valve means (9a, 10a) puts the pressurised-fluid source (8) in communication with the at least one cushion (4a, 5a), and
   a second open position in which the valve means (9a, 10a) puts the at least one cushion (4a, 5a) in communication with a vent outlet.

16. A seat according to claim 15, wherein said at least one cushion includes at least one pair of inflatable cushions (4a, 5a), wherein when one of the cushions (4a, 5a) of the pair of cushions is deflated, the respective vent outlet is connected (100), at least temporarily, to the other of the pair of cushions which is inflated.

17. A seat according to claim 15, wherein the control means (11) is controlled by the occupant of the seat (1).

18. A seat according to claim 15, wherein said automatic control means includes accelerometric sensor means (12a, 12b) associated with the control means (11) whereby the inflation pressure of the at least one cushion (4a, 5a) is controlled in dependence on signals generated by the accelerometric sensor means (12a, 12b).

19. A seat according to claim 18 wherein the accelerometric sensor means includes an accelerometer (12a) sensitive, in use, to forward/rearward accelerations of the vehicle on which the seat is mounted, and wherein the control means (11) acts to increase the inflation pressure of a cushion (4a) associated with the backrest of the seat (1) when the vehicle is accelerating.

20. A seat according to claim 2, wherein the accelerometric sensor means includes an accelerometer (12b) sensitive, in use, to transverse accelerations of the vehicle on which the seat is mounted, and wherein the control means (11) varies selectively the inflation pressure of one and the other of said cushions (5a) provided against the sides (5) of the seat (1) in dependence on the signal generated by the accelerometer (12b) sensitive to transverse accelerations of the vehicle.

21. A seat according to claim 1, wherein said automatic control means includes a pressure source connectable to said at least one cushion via at least one valve controlled by a control unit.

22. A seat according to claim 1, wherein said at least one cushion includes a left side cushion and a right side cushion, and said automatic control means uses excess pressure discharged from one of said left and right side cushions to increase pressure in the other of said left and right side cushions.

23. A vehicle seat, comprising: a generally rigid receiving structure having a surface which can receive at least part of a user's body, at least one selectively inflatable cushion interposed between the structure and the user's body in use; and a pressure means connected to said at least one cushion for selectively increasing and decreasing inflation of said at least one cushion during use; sensing means for sensing motion of the vehicle; a control unit which receives signals from said sensing means and which sends signals to said pressure means to dynamically adjust the degree of inflation of said at least one cushion during use based on motion of the vehicle.

24. A seat according to claim 23, wherein said pressure means includes a source of fluid connected to said at least one cushion via at least one valve.

25. A seat according to claim 24, wherein said at least one valve of said pressure means is operated based on said signals from said control unit in order to adjust the inflation of said at least one cushion.

26. A seat according to claim 23, further including a sheet of material covering said surface of said receiving structure, and covering said at least one selectively inflatable cushion even when said at least one cushion is fully inflated.

27. A vehicle seat, comprising:
   a generally rigid receiving structure having a surface which can receive at least part of a user's body,
   at least one selectively inflatable cushion interposed between the structure and the user's body;
   said receiving structure having a sitting portion, a back portion extending upward at the rear of said sitting portion, and first and second side portions on opposite lateral sides and extending forwardly of the back portion;
   said at least one cushion including a first side cushion on one of said side portions and a second side cushion on the other of said side portions for fitting a user's lateral sides; and
   means for selectively inflating and deflating said at least one cushion to obtain a specific volume and inflation pressure of the cushions according to requirements in use.

28. A seat according to claim 27, wherein said cushions each have separate valves.

29. A seat according to claim 27, wherein said means for selectively inflating includes means for adjusting the inflation by the user prior to use.

30. A seat according to claim 27, wherein said means for selectively inflating includes means for dynamically adjusting the inflation during use in accordance with motion of the vehicle.

31. A seat according to claim 1, wherein said automatic control means operates generally continuously over a time period so that the degree of inflation is dynamically adjusted throughout said time period.

* * * * *

UNITED STATES PATENT AND TRADEMARK OFFICE
CERTIFICATE OF CORRECTION

PATENT NO. : 5,653,465
DATED : August 5, 1997
INVENTOR(S) : Pietro Ferrero

It is certified that error appears in the above-indentified patent and that said Letters Patent is hereby corrected as shown below:

<u>In the Abstract:</u> line 5, insert -- ) -- after "5a";
Col. 2, line 1, "plastics a" should be -- a plastics"; Col. 2, line 4, before "body" insert -- vehicle --;

Signed and Sealed this

Twenty-fourth Day of March, 1998

Attest:

BRUCE LEHMAN

Attesting Officer

Commissioner of Patents and Trademarks